IMPEDANCE CONTROL COUPLING AND DECOUPLING SYSTEM

Filed March 29, 1940 2 Sheets-Sheet 1

INVENTOR
Leo C. Young
Robert M. Page
BY W. Glenn Jones
ATTORNEY

IMPEDANCE CONTROL COUPLING AND DECOUPLING SYSTEM

Filed March 29, 1940 2 Sheets-Sheet 2

INVENTOR
Leo C. Young
Robert M. Page
BY W. Glenn Jones
ATTORNEY

Patented Sept. 7, 1954 2,688,746

UNITED STATES PATENT OFFICE 2,688,746

IMPEDANCE CONTROL COUPLING AND DECOUPLING SYSTEM

Leo C. Young and Robert M. Page, Washington, D. C., assignors to Radar Incorporated, Washington, D. C., a corporation of Delaware Application March 29, 1940, Serial No. 326,640

24 Claims. (Cl. 250—13)

(Granted under Title 35, U. S. Code (1952), sec. 266)

This invention relates to means for utilizing a common antenna for alternately transmitting and receiving radio signals and more particularly to such apparatus wherein the switching from transmitter to receiver and vice versa is automatically effected by changes in impedance.

Among the several objects of this invention are:

To provide means whereby a receiver may be operated from the same antenna as that to which a transmitter is coupled without damage to the receiver from the high energy levels of the transmitter;

To provide means for effectively disconnecting a load circuit from an alternating current line when the line voltage exceeds a predetermined value and to reconnect the load circuit when the voltage falls to or below such maximum value;

To provide means for connecting a load circuit to an alternating current line when the voltage exceeds a predetermined value and to disconnect the load from the line when the line voltage falls below such predetermined value.

In the drawings:

Fig. 1 discloses an embodiment of our invention wherein two quarter-wave resonant lines have a common shorting bar, the transmitter being connected to one of the said lines and the receiver to the other thereof;

It is frequently deisrable to utilize a common antenna for both a transmitter and a receiver, to save weight, space, etc. However, unless the receiver is effectively disconnected from the antenna during intervals of operation of the transmitter, the receiver is damaged by the excessive load impressed thereon during transmission and conversely, if the transmitter absorbs energy from the antenna during reception, the receiver does not function properly. The present invention provides apparatus whereby automatic impedance changes protect the receiver during transmission and eliminate absorption of energy by the transmitter during periods of reception.

Figure 1:
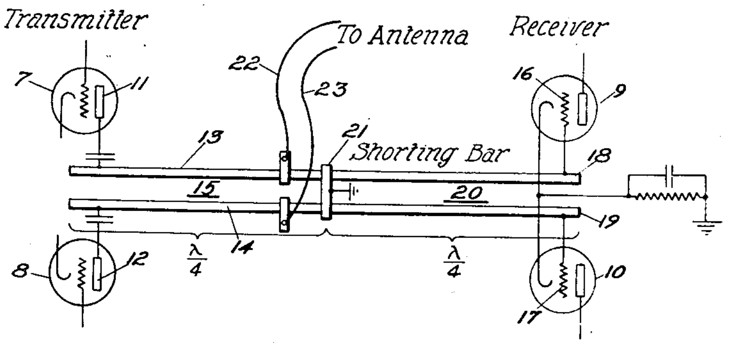

In Fig. 1, the transmitter is diagrammatically represented by the tubes 7 and 8 and the receiver by tubes 9 and 10. Tubes 7 and 8 have their anodes 11 and 12 respectively coupled to the members 13 and 14 of the quarter-wave parallel resonant line designated generally by 15, while the tubes 9 and 10 have their grids 16 and 17 respectively connected to the members 18 and 19 of quarter-wave resonant line 20, the two resonant lines having a common grounded shorting bar 21. The antenna leads 22 and 23 are respectively connected to the members 13 and 14.

The impedance of the receiver is matched with the impedance of the line through to the antenna when normal operating potential is applied to grids 16 and 17, but when these grids are swung strongly positive the impedance of the receiver is so mismatched with the line impedance that the absorption of energy by the receiver is negligible. This condition of impedance mismatch of the receiver obtains during operation of the transmitter. When the transmitter is not operating the internal anode cathode resistance of the transmitter tubes 7 and 8 becomes almost infinitely high and consequently no energy is absorbed by the transmitter during intervals of reception. It is obvious that the transmitter and the receiver may be operated alternately but not simultaneously.

Three conditions are necessary for successful operation of the system shown in Fig. 1. These conditions are: (1) The transmitter must be completely blocked during reception; (2) The frequency at which the system is operated must be such that the grid input impedance of the receiver is very much greater at normal bias than with the input grids 16 and 17 positive; (3) The direct current resistance of the input circuit including grids 16 and 17 must be low. A system like that illustrated in Fig. 1 has been successfully operated at frequencies up to 80 megacycles with acorn tubes (type 954) in the receiver input and a 10 kilowatt power level in the transmitter output.

Condition 1 may be satisfied by conventional transmitter keying circuits, rendering the tubes 7 and 8 inoperative by a grid blocking potential which is raised to permit conduction for operation.

Figure 2:
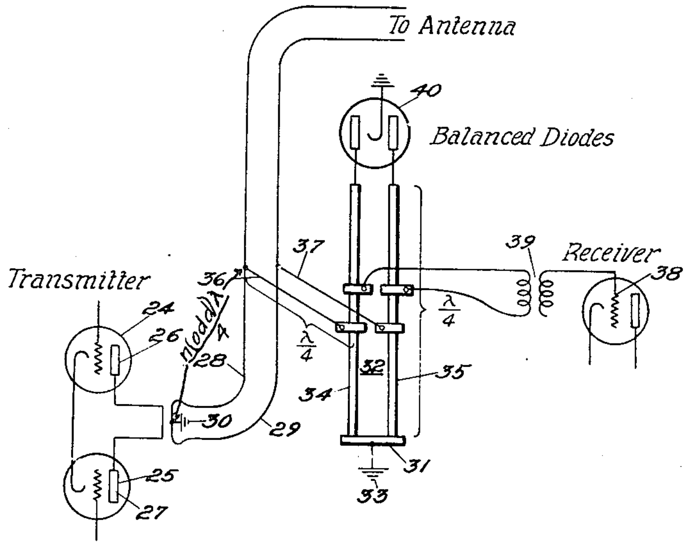
Fig. 2 depicts another form of our invention wherein a single parallel resonant line device is used with means for changing the impedance at the free ends of the line members when the voltage equals or exceeds a predetermined value.
Figure 3:
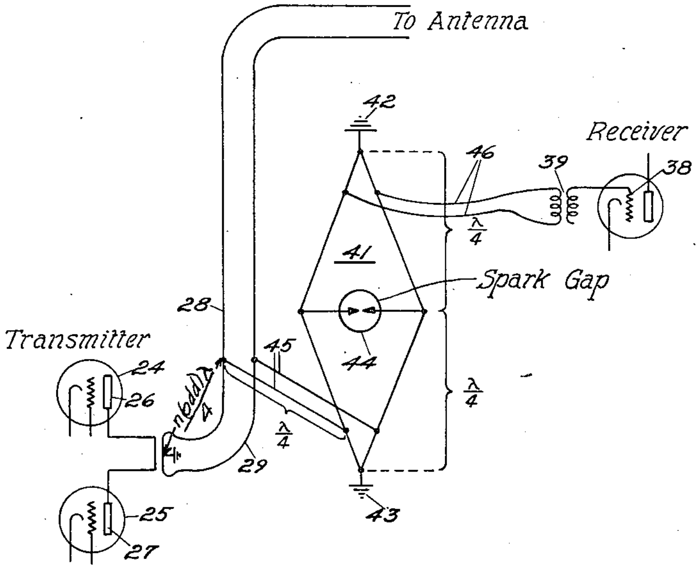
Fig. 3 is in general similar to Fig. 2 but here the resonant lines are half-wave instead of quarter-wave.

When condition 2, above stated, is not satisfied, an additional electronic or ionic element must be used. This element must present high resistance at low voltage and low resistance at high voltage at the operating frequency, preferably with a substantially instantaneous change in resistance at the critical voltage. High frequency diodes or reduced pressure spark gaps are best suited to this use. Figs. 2 and 3 depict forms of our invention wherein such electronic elements are utilized.

In Fig. 2, transmitter tubes 24 and 25 have their anodes 26 and 27 coupled to antenna leads 28 and 29 which are grounded at 30. Shorting bar 31 of parallel resonant line 32 is grounded at 33 and the two parallel members 34 and 35 thereof are connected to antenna leads 28 and 29 by quarter-wave leads 36 and 37 respectively, and coupled to receiver input grid 38 by a suitable transformer 39. It is well known that a voltage antinode exists at the end of a quarter-wave resonant line remote from the shorting bar and we have therefore provided the balanced diode 40 with an anode thereof respectively connected to each of the members 34 and 35 of resonant line 32. The diode 40 ignites and passes current at and above a predetermined voltage and hence destroys the impedance match of the receiver through to lines 28 and 29 when the voltage impressed on diode 40 is swung above the predetermined limit during transmission. The quarter-wave leads 36 and 37 are an impedance inverting device and serve to transfer a short circuit at the resonant line 32 to a virtual open circuit across the transmission line. During the reception of energy, with transmitter tubes 24 and 25 inoperative, the receiver is effectively matched through to the antenna and consequently efficiently absorbs the energy from the antenna.

In Fig. 3, the transmitter tubes 24 and 25 likewise have their anodes 26 and 27 coupled to antenna leads 28 and 29. In this case, however, the resonant line through which coupling to the receiver input grid 38 is effected is a half-wave line, designated generally by 41, the extremities being grounded at 42 and 43 and a low pressure spark gap 44 being connected across the high impedance midpoints of the line 41. The line 41 is connected to the antenna leads 28 and 29 by impedance inverting quarter-wave leads 45 and on the other side of spark gap 44 the line 41 is coupled to receiver input grid 38 by transmission line 46 and transformer 39. Here the operation is the same as above described in connection with Fig. 2. The high voltage appearing across the line 41 ignites spark gap 44 and destroys the impedance match from the receiver to the antenna during transmission but when 44 is not conducting the receiver is coupled to the antenna.

Figure 4:
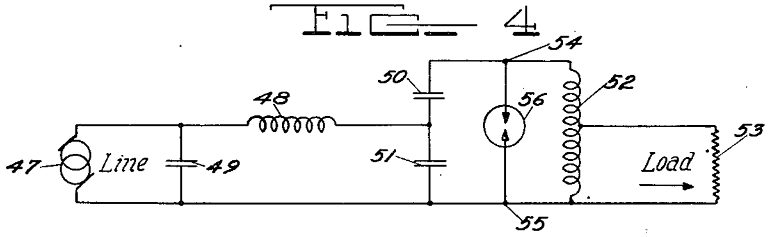
Fig. 4 illustrates our invention embodied in apparatus having lumped constants instead of distributed constants.

Fig. 4 illustrates a circuit similar to that in Fig. 2 except that lumped reactive elements are used in place of distributed elements. The line, indicated generically by the generator symbol 47 is connected through inductance 48 and capacitance 49 to a parallel resonant circuit including capacitances 49 and 51, which are of equal value, and inductance 52. The load 53 is connected to one terminal of inductance 52 and to a tap thereon, this form of impedance matching being well known in the art. The circuit comprising capacitance 49, inductance 48 and capacitance 51 is an impedance inverting network that will transform a short circuit across one capacitance to anti-resonant impedance across the other. The values of capacitance 49 and inductance 48 are so chosen that the reciprocal of their product equals $\omega^2$, the symbol $\omega$ being equal to $2\pi$ times the frequency. Also, the values of capacitances 50 and 51 and inductance 52 are so chosen that the reciprocal of the product of the series capacitance and inductance is equal to $\omega^2$. It is apparent that when the alternating current applied to the parallel resonant circuit 50, 51, 52 is of the resonant frequency of this circuit, a high voltage will be developed between the points 54 and 55 which will result in a break-down of the ionic conducting device 56 at a predetermined voltage and hence there will be no voltage drop across the load 53. However, when the potential between points 54 and 55 is less than that required to render device 56 conductive, the load 53 will be supplied with power.

Figure 5:
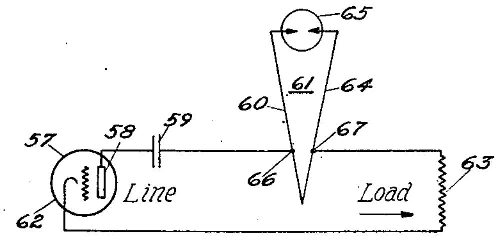
Figs. 5 and 6 are equivalent circuits embodying the principle of the present invention, the former using resonant means having distributed constants and the latter using lumped constants.
Figure 6:
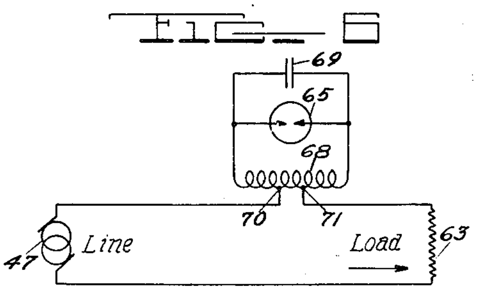

The circuits of Figs. 2, 3 and 4 are all designed to disconnect the load from the line when the line voltage rises to such a value that the safety discharge device becomes conducting and to reconnect the load to the line when the voltage drops so that the safety device becomes non-conducting. Figs. 5 and 6 illustrate circuits for operating under reverse conditions, that is, the load is connected to the line when the voltage is above a predetermined value and disconnected therefrom when the voltages fall below a lower fixed value.

In Fig. 5, the line, represented by the tube 57, is shown with its anode 58 coupled through capacitance 59 to a member 60 of resonant line 61 and with its cathode 62 connected through load 63 to the other member 64 of resonant line 61. The high impedance ends of lines 61 are connected together through the ionic conducting device 65 that is ignited and becomes conducting at a predetermined voltage. It is apparent that when the device 65 is non-conducting a high impedance exists between the points 66 and 67 and consequently the line potential is dropped between these points and very little appears across load 63, but when the voltage across device 65 is sufficiently high, the device 65 becomes conducting, the high impedance between 66 and 67 disappears and power is supplied to load 63.

Fig. 6 is identical in principle with Fig. 5 but here the reactance elements are lumped in inductance 68 and capacitance 69 connected in parallel therewith. The device 65 is connected across inductance 68 and capacitance 69 in parallel with both, while load 63 and line 47 are connected to spaced taps on inductance 68.

For effective operation, the resonant impedance between points 66 and 67 in Fig. 5 and points 70 and 71 in Fig. 6 must be high relative to the impedance of load 63. The impedance between the specified points in the respective figures is adjusted by varying the points of connection of load and line to the resonant circuit and this variation in adjustment also alters the ratio between the voltage across the points of connection and the voltage across the device 65.

The invention herein described and claimed may be used and/or manufactured by or for the Government of the United States of America for governmental purposes without the payment of any royalties thereon or therefor.

We claim:

1. Apparatus as described, comprising conductive means carrying alternating current, a resonant circuit including two capacitances in series and an inductance in parallel with both said capacitances, means normally non-conductive but that is rendered conductive by voltages above a predetermined value connected across the high impedance points of said resonant circuit, a load operatively connected to said inductance, and means constituting an impedance inverting connection across one of said series connected capacitances and said conductive means.

2. Apparatus as described, comprising conductive means carrying alternating current, a resonant circuit including a capacitance and an inductance in parallel, means normally nonconductive but that is rendered conductive by voltages above a predetermined value connected across the high impedance points of said resonant circuit, means connecting said conductive means to a point on said inductance, and a load connected at one side to a point on said inductance spaced from the first mentioned point and at the other side to said conductive means.

3. An apparatus comprising conductive means carrying alternating current, a load circuit and means effectively to connect said conductive means to said load circuit under certain voltage conditions and in effect to disconnect said conductive means from said load circuit under other voltage conditions, said connecting means including a transmission line equal in length to an odd number of quarter-wave lengths of said alternating current having one end thereof connected to said conductive means and impedance matching means responsive to a predetermined voltage to establish a substantial short circuit connected between the other end of said transmission line and said load.

4. In combination, an electric generator adapted for intermittent operation, a load circuit therefor, a transmission channel coupling said generator to said load, said channel comprising generator decoupling series high impedance means and a non-linear impedance device operatively coupled to said impedance means, said device operative responsive to a predetermined energy output from said generator to effectively short circuit said impedance means during the intervals said generator is producing an output.

5. In combination, an electric generator adapted for intermittent operation, a load circuit therefor, a transmission channel coupling said generator to said load, said channel comprising a generator decoupling serially connected impedance transformer and circuit means coupled in shunt across the transformer consisting of a nonlinear impedance device responsive to a predetermined energy output from said generator to effectively short circuit said impedance transformer during the intervals said generator is producing an output.

6. In combination, a transmitter, a receiver, a common antenna for said transmitter and receiver, a first transmission line leading from said transmitter to said antenna, a second transmission line leading from said receiver, a transformer network interconnecting said second transmission line with said first transmission line, said transformer network including means for increasing the voltage from said first transmission line to said network and means for equally decreasing the voltage from said network to said second transmission line, and a space discharge device connected across said transformer network intermediate said two means, said space discharge device having a voltage breakdown characteristic which is a small percentage of the voltage applied to said network from said first transmission line, whereby the resultant voltage applied to said second transmission line through said second means is a small percentage of the breakdown voltage.

7. The combination according to claim 6, in which said first and second transmission lines have matched, relatively low impedances, and said transformer network has a relatively high impedance and an electrical length equal to a half wavelength of the transmitter operating frequency, and in which said space discharge device is connected across said transformer network at the mid, quarter-wavelength point.

8. In combination, a transmitter, a receiver, a common antenna for said transmitter and receiver, a first transmission line leading from said transmitter to said antenna, a second transmission line leading from said receiver, a line network interconnecting said second transmission line with said first transmission line, said network including a third transmission line leading from said first line to said second line, a branch line connected at one of its ends to the junction between said second and third lines, and a space discharge device connected across said branch line.

9. In combination, a transmitter, a receiver, a common antenna for said transmitter and receiver, a first transmission line leading from said transmitter to said antenna, a second transmission line leading from said receiver, transformer means interconnecting said second transmission line with said first transmission line, said transformer means comprising means for increasing the voltage from said first transmission line to said means and for supplying a voltage less than said increased value to said second transmission line, and a space discharge device connected across said transformer means to receive said increased voltage, said space discharge device having a voltage breakdown characteristic which is a fraction of said increased voltage whereby the resultant voltage applied to said second transmission line through said transformer means is a fraction of the breakdown voltage.

10. A signaling system including in combination a load, a transmitter, a first transmission system connected between said load and said transmitter to transfer power at a predetermined frequency from said transmitter to said load, a receiver, a second transmission system, means coupling said receiver to said second transmission system, and a connection between said first and second transmission systems at a point where the first transmission system from said point to said transmitter will have substantially no effect on said second system when said receiver is operated at said predetermined frequency and said transmitter is not energized.

11. A signaling system including in combination an antenna, a transmitter, a first transmission line connected between said antenna and said transmitter to transfer power from said transmitter to said antenna, a radio receiver, a second transmission line, means coupling said receiver to said second line, and a connection between said first and second lines at a length from said transmitter to said connection at which said transmitter will have substantially no effect on said second line when said receiver is operated and said transmitter is not energized, said second line being of a length which is so chosen that the second line will have a negligible effect on said first line when said transmitter is operated.

12. A signaling system including in combination a load circuit, a transmission line, a source of radio frequency energy of predetermined frequency, means for coupling said load circuit and said source to the terminals of said transmission line, a radio receiver, a second transmission line, means coupling said receiver to said second line, and a connection from said second line to said first-mentioned transmission line at a point on said first-mentioned transmission line at which the second line has a negligible effect on said first line when said energy is applied, said second line having a length which offers at said predetermined frequency an impedance of the order of the operating input impedance of said radio receiver.

13. A signaling system including in combination a radiator, a transmission line, a source of energy of predetermined radio frequency, means for coupling said radiator and said source to the terminals of said transmission line, a radio receiver, a second transmission line, a connection from said second line to said first-mentioned transmission line at a length from said transmitter at which the second line has a negligible effect on said first line during periods of transmission at said predetermined frequency, and means coupling said receiver to said second line, said last coupling means being matched to effect maximum transfer of received energy to said receiver at said predetermined frequency.

14. A signaling system including an antenna, a transmitter having a low impedance output circuit, a radio receiver, a first transmission line having input and output terminals, means for coupling the input terminals with the output circuit and the output terminals with the antenna, a second transmission line connected to said first line at a distance equal to $$(2n+1)\frac{\lambda}{4}$$

from said output circuit, and means coupling said radio receiver to said second line and having a transfer ratio which will transfer substantially the maximum power from said antenna to said receiver.

15. A signaling system including an antenna, a transmitter having a low impedance output circuit, a radio receiver, a first transmission line having input and output terminals, a coupling network for connecting said input terminals to said output circuit, a second transmission line connected to said first line at a distance equal to $$(2n+1)\frac{\lambda}{4}$$

from said output circuit, and means coupling said radio receiver to said second line.

16. A signaling system, comprising a transmitter, a receiver, an antenna system, and transmission lines of fixed lengths connecting said transmitter and said receiver to said antenna system and in which the load impedances of said transmitter and said receiver change from conditions of operation or nonoperation, and in which said transmission lines invert said impedances respectively to make an efficient or an inefficient coupling to said antenna.

17. In combination, a transmitter, a receiver, a common antenna for said transmitter and receiver, a first transmission line leading from said transmitter to said antenna, a second transmission line leading from said receiver, a transformer network having an electrical length equal to a half wavelength of the transmitter operating frequency interconnecting said second transmission line with said first transmission line, said transformer network including means for increasing the voltage from said first transmission line to said network and means for equally decreasing the voltage from said network to said second transmission line, and a space discharge device connected across said transformer network intermediate said two means at the mid, quarter wavelength point, said space discharge device having a voltage breakdown characteristic which is a small percentage of the voltage applied to said network from said first transmission line, whereby the resultant voltage applied to said second transmission line through said second means is a small percentage of the breakdown voltage.

18. A radio system comprising a transmitter operable to supply power at a predetermined radio frequency, antenna means operative at said frequency, a first transmission system coupling the transmitter to the antenna means for radio transmission, a branch transmission system comprising impedance inverting means coupled to said first transmission system, voltage transformer means resonant at the predetermined frequency having a low voltage input and a high voltage output, and a space path discharge device having an abrupt voltage breakdown characteristic coupled to the high voltage output, the impedance inverting means being coupled to the low voltage input, the breakdown voltage of the space discharge device being substantially below the voltage applied thereto during transmitter operation and substantially above the voltage applied thereto from the antenna in absence of transmitter operation.

19. A radio system comprising a transmitter operable to supply power at a predetermined radio frequency, antenna means operative at said frequency, a first transmission system coupling the transmitter to the antenna means for radio transmission, a branch transmission system comprising impedance inverting means coupled to said first transmission system, voltage transformer means resonant at the predetermined frequency having a low voltage input and low and high voltage outputs, a space path discharge device coupled to the high voltage output, the impedance inverting means being coupled to the low voltage input, the breakdown voltage of the space discharge device being substantially below the voltage applied thereto during transmitter operation and substantially above the voltage applied thereto from the antenna in the absence of transmitter operation, and receiver means responsive to the predetermined frequency coupled to the low voltage output.

20. In combination, an alternating current transmission system, a high power source coupled to the system, a low power source coupled to the system, voltage transformer means resonant under application of power from the high power source having a low voltage input and a high voltage output, impedance inverting means coupling the transmission system to the low voltage input and space path discharge means coupled to the high voltage output having a critical minimum conduction voltage characteristic above the voltage applied thereto by the low power source and below the voltage applied thereto by the high power source.

21. In combination, an alternating current transmission system, a high power source coupled to the system, a low power source coupled to the system, space path discharge means having a critical minimum conduction voltage characteristic, and impedance inverting means coupled between the transmission system and the space path discharge means to apply power to the discharge means, the critical voltage characteristic of the space path discharge means being greater than the voltage applied thereto from the low power source and less than the voltage applied thereto from the high power source.

22. In combination, a centrally short circuited half-wave resonant line section, a source of resonant energy coupled to said section near one end, a transmission line coupled to the section intermediately of said one end and the center of the section, and resonant energy receiver means coupled to the section near its other end comprising non-linear impedance means operative to shunt the section with low impedance only at high resonant power levels applied by said source.

23. A transmission system comprising a conductive structure presenting in section a closed continuous conductive path, a first transmission system electrically coupled to said structure operative to apply wave energy resonantly exciting the structure, a second transmission system electrically coupled to said structure remotely of the first system operative to conduct wave energy from said structure, and spark discharge means bridging the structure intermediately of the two transmission systems operative on conduction at high power level to disrupt the electrical resonance of the structure to the applied wave energy.

24. A radio system comprising an antenna, a first transmission system coupled with the antenna, a transmitter branch transmission system, a receiver branch transmission system, the branch systems comprising alternatively operative impedance inverting means electrically coupled in parallel to the first transmission system normally matching the receiver to the antenna, a normally nonconductive impedance shift space path discharge device in each branch coupled to the respective impedance inverting means in input impedance controlling relationship of the respective branch, and common control means operative during transmission to effect conduction through both space path discharge devices simultaneously.

References Cited in the file of this patent

UNITED STATES PATENTS

| Number | Name | Date |
|---|---|---|
| 1,035,958 | Girardeau | Aug. 20, 1912 |
| 1,073,624 | Pickerill | Sept. 23, 1913 |
| 1,488,006 | Heising | Mar. 25, 1924 |
| 1,872,398 | Brown | Aug. 16, 1932 |
| 2,144,836 | Dietrich | Jan. 24, 1939 |
| 2,189,549 | Hershberger | Feb. 6, 1940 |
| 2,219,922 | Gossel | Oct. 29, 1940 |
| 2,235,010 | Chaffee | Mar. 18, 1941 |
| 2,281,274 | Dallenbach et al. | Apr. 28, 1942 |
| 2,400,796 | Watts et al. | May 21, 1946 |

FOREIGN PATENTS

| Number | Country | Date |
|---|---|---|
| 345,918 | Great Britain | Apr. 2, 1931 |
| 358,917 | Great Britain | Oct. 14, 1931 |
| 485,959 | Great Britain | May 27, 1938 |